United States Patent

Collier et al.

(10) Patent No.: US 8,091,351 B2
(45) Date of Patent: Jan. 10, 2012

(54) NON-ZEOLITE BASE METAL SCR CATALYST

(75) Inventors: Jillian Elaine Collier, Reading (GB); Sylvie Cecile Laroze, Brightwell-cum-Sotwell (GB); Raj Rao Rajaram, Slough (GB); David William Prest, Durham (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 13/176,230

(22) Filed: Jul. 5, 2011

(65) Prior Publication Data

US 2011/0263417 A1 Oct. 27, 2011

Related U.S. Application Data

(63) Continuation of application No. 12/666,444, filed as application No. PCT/GB2008/050490 on Jun. 25, 2008, now Pat. No. 7,985,391.

(30) Foreign Application Priority Data

Jun. 25, 2007 (GB) .................... 0712228.6

(51) Int. Cl.
*B01D 53/94* (2006.01)
*F01N 3/10* (2006.01)

(52) U.S. Cl. ............ 60/301; 423/213.2; 423/239.1

(58) Field of Classification Search ........... 423/213.2, 423/239.1; 60/301
See application file for complete search history.

(56) References Cited

U.S. PATENT DOCUMENTS

| | | | |
|---|---|---|---|
| 4,085,193 A | 4/1978 | Nakajima | |
| 4,916,107 A | 4/1990 | Brand | |
| 4,961,917 A | 10/1990 | Byrne | |
| 5,401,478 A | 3/1995 | Chang | |
| 5,552,128 A | 9/1996 | Chang | |
| 5,712,218 A | 1/1998 | Chopin | |
| 5,895,772 A | 4/1999 | Grigorova | |
| 7,985,391 B2 * | 7/2011 | Collier et al. .......... | 423/239.1 |
| 2004/0228785 A1 | 11/2004 | Duclos | |
| 2005/0163691 A1 | 7/2005 | Kelkar | |
| 2005/0232826 A1 | 10/2005 | LaBarge | |
| 2010/0034717 A1 | 2/2010 | Adelmann | |

FOREIGN PATENT DOCUMENTS

EP  0960649  12/1999

(Continued)

OTHER PUBLICATIONS

N. Apostolescu et al., "Selective Catalytic Reduction of Nitrogen Oxides by Ammonia on Iron Oxide Catalysts," Applied Catalysis B: Environmental, 2006, vol. 62, pp. 104-114.

(Continued)

*Primary Examiner* — Timothy Vanoy
(74) *Attorney, Agent, or Firm* — Jimmie Johnson

(57) ABSTRACT

An article for treating a gas containing nitrogen oxides including:
(a) a monolith substrate; and
(b) a catalytic composition containing at least one catalytic component consisting of (i) at least one transition metal dispersed on a mixed oxide or composite oxide or a mixture thereof as support material consisting of cerium and zirconium; or (ii) cerium oxide and zirconium oxide as single oxides or a composite oxide thereof or a mixture of the single oxides and the composite oxide dispersed on an inert oxide support material, wherein at least one transition metal is dispersed thereon, provided that at least one selected transition metal is tungsten, wherein the catalytic composition is disposed on the monolith substrate.

20 Claims, 2 Drawing Sheets

FOREIGN PATENT DOCUMENTS

| | | |
|---|---|---|
| EP | 1504805 | 2/2005 |
| EP | 1516855 | 3/2005 |
| EP | 1736232 | 12/2006 |
| GB | 1473883 | 5/1977 |
| JP | 5242464 | 4/1977 |
| JP | 6190276 | 7/1994 |
| JP | 2003126694 | 5/2003 |
| JP | 2003326167 | 11/2003 |
| JP | 2005125317 | 5/2005 |
| WO | 9939809 | 8/1999 |
| WO | 2007007889 | 1/2007 |
| WO | 2008023762 | 2/2008 |
| WO | 2008049491 | 5/2008 |
| WO | 2008150462 | 12/2008 |

OTHER PUBLICATIONS

Li et al., "WO3/CeO2-ZrO2, a promising catalyst for selective catalytic reduction (SCR) of NOx with NH3 in diesel exhaust," Chem. Commun., 2008, 1470-1472.

Verdier, et al., "Doped Zirconia with Acidity and High Thermal Stability, for Durable Diesel Catalysts," SAE Technical Paper Series, Paper No. 2007-01-0238, 2007 World Congress, Detroit, Michigan, Apr. 16-19, 2007.

* cited by examiner

NON-ZEOLITE BASE METAL SCR CATALYST

CROSS-REFERENCE TO RELATED APPLICATIONS

This application is a continuation of U.S. patent application Ser. No. 12/666,444, filed Jun. 3, 2010, now U.S. Pat. No. 7,985,931 which is the U.S. National Phase of PCT International Application No. PCT/GB2008/050490, filed Jun. 25, 2008, and claims priority of Great Britain Patent Application No. 0712228.6, filed Jun. 25, 2007, the disclosures of all of which are incorporated herein by reference in their entirety for all purposes.

FIELD OF THE INVENTION

The present invention relates to a method of selectively catalytically converting nitrogen oxides ($NO_x$) present in a gas stream to nitrogen with a non-zeolite, non-vanadium base metal catalyst using a nitrogenous reductant such as ammonia ($NH_3$) and in particular it relates to such a method wherein the catalyst is particularly active at relatively low temperatures compared with known non-zeolite, base metal catalysts.

BACKGROUND OF THE INVENTION

Several chemical reactions occur in a selective catalytic reduction (SCR) system using $NH_3$ as reductant, all of which represent desirable reactions which reduce $NO_x$ to elemental nitrogen. The dominant reaction mechanism is represented in equation (1).

$$4NO+4NH_3+O_2 \rightarrow 4N_2+6H_2O \quad (1)$$

Competing, non-selective reactions with oxygen can produce secondary emissions or may unproductively consume $NH_3$. One such non-selective reaction is the complete oxidation of $NH_3$, represented in equation (2).

$$4NH_3+5O_2 \rightarrow 4NO+6H_2O \quad (2)$$

Furthermore, the reaction of $NO_2$ present in the $NO_x$ with $NH_3$ is considered to proceed according to reaction (3).

$$3NO_2+4NH_3 \rightarrow (7/2)N_2+6H_2O \quad (3)$$

Further, the reaction between $NH_3$ and NO and $NO_2$ is represented by reaction (4):

$$NO+NO_2+2NH_3 \rightarrow 2N_2+3H_2O \quad (4)$$

Although the reaction rates of the reactions (1), (3) and (4) vary greatly depending on the reaction temperature and the sort of the catalyst used, that of the reaction (4) is, in general, 2 to 10 times as high as those of the reactions (1) and (3).

The application of SCR technology to treat NOx emissions from vehicular IC engines, particularly lean-burn IC engines, is well known. A typical prior art SCR catalyst disclosed for this purpose includes $V_2O_5/WO_3$ supported on $TiO_2$ (see WO 99/39809). However, in some applications the thermal durability and performance of vanadium-based catalyst may not be acceptable.

One class of SCR catalysts that has been investigated for treating $NO_x$ from internal combustion engine exhaust gas is transition metal exchanged zeolites (see WO 99/39809 and U.S. Pat. No. 4,961,917). However, in use, certain aluminosilicate zeolites such as ZSM-5 and beta zeolites have a number of drawbacks. They are susceptible to dealumination during high temperature hydrothermal ageing resulting in a loss of acidity, especially with Cu/beta and Cu/ZSM-5 catalysts; both beta- and ZSM-5-based catalysts are also affected by hydrocarbons which become adsorbed on the catalysts at relatively low temperatures and are oxidised as the temperature of the catalytic system is raised generating a significant exotherm, which can thermally damage the catalyst. This problem is particularly acute in vehicular diesel applications where significant quantities of hydrocarbon can be adsorbed on the catalyst during cold-start; and beta and ZSM-5 zeolites are also prone to coking by hydrocarbons, which reduces catalyst performance. Accordingly, we have directed research to finding alternatives to transition metal exchanged zeolites and vanadium-based catalysts for SCR.

U.S. Pat. No. 5,552,128 claims a method for converting nitrogen oxides to nitrogen by contacting the nitrogen oxides with a reducing agent in the presence of a catalyst consisting essentially of an acidic solid component comprising a Group IVB metal oxide modified with an oxyanion of a Group VIB metal and further containing at least one metal selected from the group consisting of Group IB, Group IVA, Group VB, Group VIIB and Group VIII and mixtures thereof. The catalysts can be prepared by impregnation, co-precipitation or hydrothermal treatment of a hydrated Group IVB metal prior to contact with a Group VIB metal. A preferred catalyst consists essentially of iron (Group VIII), tungsten (Group VIB) and zirconium (Group IVB). Although a catalyst consisting of zirconium, tungsten and cerium is exemplified (Catalyst B), our understanding of the prosecution file is that cerium, and rare earth metals more generally, were dropped from the claims, and the claims were restricted from "comprising" to "consisting essentially of", in order to meet an objection by the Examiner based on Japanese patent publication no. 6-190276.

Japanese patent publication no. 6-190276 discloses a catalyst for selectively reducing $NO_x$ with hydrocarbons in a comparatively low-temperature region, which catalyst comprises both a basic metal (such as magnesium, calcium, strontium, barium, sodium, potassium, rubidium, caesium, lanthanum or zinc) or its oxide and an acidic metal (such as tungsten, molybdenum, cobalt, iron, silver or silicon) or its oxide supported on aluminium oxide ($Al_2O_3$), zirconium oxide ($ZrO_2$), yttrium oxide ($Y_2O_3$), potassium oxide ($Ga_2O_3$) or tin oxide ($SnO_2$) which reduce the nitrogen oxide by the selective reduction method to nitrogen by being brought into contact with the nitrogen oxide together with the hydrocarbon as the reducing gas. Illustrative examples include gamma aluminium oxide supporting both tungsten oxide or molybdenum oxide and magnesium oxide and zirconium oxide supporting both tungsten oxide and magnesium oxide.

EP 1736232 discloses a catalyst system comprising a first reaction unit which is loaded with a first catalyst containing, as active constituents, a composite oxide consisting of two or more oxides selected from silica, alumina, titania, zirconia and tungsten oxide, and a rare earth metal or a transition metal (excluding Cu, Co, Ni, Mn, Cr and V), and a second reaction unit which is loaded with a second catalyst containing, as active constituents, a noble metal and a silica-alumina composite oxide. Illustrative examples of the first catalyst include the composite oxides Ce—Ti—$SO_4$—Zr (obtained by adding cerium and sulfur to a titania-zirconia type complex oxide), Fe—Si—Al (obtained by adding iron to a silica-alumina type complex oxide) and Ce—W—Zr (obtained by adding cerium to a tungsten oxide-zirconia type complex oxide).

U.S. Pat. No. 4,085,193 discloses a catalyst composition for reducing nitrogen oxides comprising an intimate mixture of titanium as component A with at least one metal selected from the group consisting of molybdenum (Mo), tungsten (W), iron (Fe), vanadium, (V), nickel (Ni), cobalt (Co), copper (Cu), chromium (Cr) and uranium (U) as component B, in the form of their oxides, and a process for reducing nitrogen oxides to nitrogen, which comprises contacting a gaseous mixture containing nitrogen oxides and molecular oxygen and a reducing gas with the catalyst composition at an elevated temperature. Ti—W and Ti—W—Fe are illustrated and the activity of Ti—W is compared favourably with the activity of Zr—W.

U.S. Pat. No. 4,916,107 discloses a catalyst for the selective reduction with ammonia of nitrogen oxides from an intimate mixture of at least three metals in the form of their oxides, namely (A) titanium as constituent (A), (B1) tungsten as the first constituent B, and (B2) at least one of the metals vanadium, iron, niobium, and/or molybdenum as the second constituent (B), with an atomic ratio of the metals of constituent (A) to (B) of 1:0.001 to 1, preferably 1:0.003 to 0.3.

JP 52-42464 discloses a method of reducing and removing $NO_x$ in exhaust gas comprising contacting the exhaust gas and ammonia with a catalyst in a temperature range of 200-500° C., said catalyst containing 50-97% (atomic percent) titanium oxide as its first active ingredient, 2-49% (atomic percent) cerium oxide as its second active ingredient, and 1-30% (atomic percent) of at least one compound selected from molybdenum oxide, tungsten oxide, vanadium oxide, iron oxide, and copper oxide as its third active ingredient. Illustrative examples include Ti—Ce—Cu, Ti—Ce—Fe, Ti—Ce—W and Ti—Ce—Mo.

GB 1473883 discloses a catalyst composition for the reduction of nitrogen oxides comprising iron and tungsten in the form of their oxides in an atomic ratio Fe/W of 1:0.001-1 and having a surface area of at least 5 m$^2$/g obtainable by calcining at 300-700° C. The catalyst may contain an oxide of a further element from Groups IB, IIA, IIIB, IV, VA, VIA, VIII or of the rare earths, e.g. Cu, Mg, Al, Si, Ti, Zr, Sn, V, Nb, Cr, Mo, Co, Ni and Ce, in an atomic ratio based on iron not exceeding 1:0.15. The catalyst may be supported, e.g. on silica, alumina, silica-alumina, diatomaceous earth, acid clay, active clay, zeolite, titania or zirconia and may be prepared by impregnation or precipitation.

N. Apostolescu et al. (Applied Catalysis B: Environmental 62 (2006) 104-114) disclose a SCR catalyst for treating $NO_x$ in diesel exhaust gas obtainable by coating $ZrO_2$ with 1.4 mol % Fe and 7.0 mol % $WO_3$ SCR catalyst which demonstrates improved SCR performance relative to $Fe_2O_3/ZrO_2$. The $ZrO_2$ is obtained by adding $ZrO(NO_3)_2$ to an aqueous solution of hydrazine. In our own investigations, we have determined that for improved thermal stability and SCR activity it is important for the $ZrO_2$ to be present in its tetragonal phase. We have investigated the N. Apostolescu et al. catalysts and have found that, whilst they claim to obtain $ZrO_2$ tetragonal phase, their catalyst is not as active as catalysts containing $ZrO_2$ that we have prepared.

JP 2003-326167 discloses a SCR catalyst suitable for treating $NO_x$ in exhaust gas from an internal combustion engine comprising tungsten oxide or molybdenum oxide on a carrier consisting of sulphated zirconium oxide.

SAE 2007-01-0238 discloses investigations into acidic doped zirconia for use in $NH_3$—SCR catalysis. The materials tested include Zr—Si, Zr—Si—W and Zr—Ti—Si—W.

SUMMARY OF THE INVENTION

We have now discovered a non-zeolite, non-vanadium base metal $NH_3$ SCR catalyst that is more active at relatively low temperatures compared with the preferred catalysts of U.S. Pat. No. 5,552,128, i.e. Fe—W/$ZrO_2$. In particular, we have discovered that an Fe—W/CeZrO$_2$ material delivers comparatively better performance, especially at low temperature, for the fast SCR reaction (reaction (4) hereinabove) than Fe—W/$ZrO_2$ catalysts.

According to one aspect, the invention provides a method of converting nitrogen oxides in a gas stream to nitrogen by contacting the nitrogen oxides with a nitrogenous reducing agent in the presence of a non-zeolite base metal catalyst consisting of:

(a) at least one transition metal dispersed on a mixed oxide or composite oxide or a mixture thereof as support material consisting of cerium and zirconium; or (b) cerium oxide and zirconium oxide as single oxides or a composite oxide thereof or a mixture of the single oxides and the composite oxide dispersed on an inert oxide support material, whereon is dispersed at least one transition metal.

BRIEF DESCRIPTION OF THE DRAWINGS

In order that the invention may be more fully understood, the following Examples are provided by way of illustration only and with reference to the accompanying drawings, in which.

DETAILED DESCRIPTION OF THE INVENTION

Figure 1:
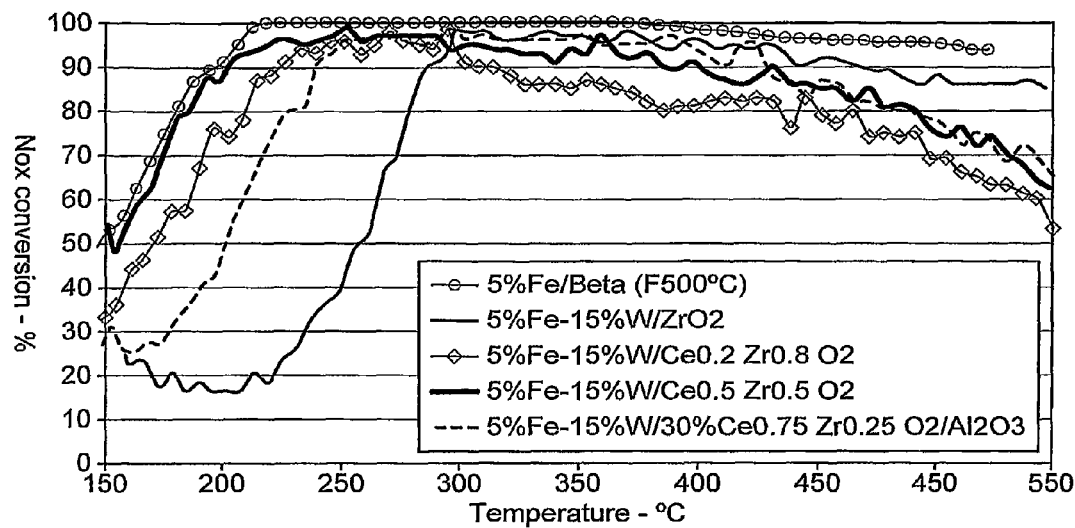
FIG. 1 is a graph showing the NO conversion profiles for Fe—W/CeO$_2$—ZrO$_2$ catalysts according to the invention compared with a Fe—W/ZrO$_2$ catalyst and a fresh Fe/Beta catalyst.

In one embodiment, the content of cerium and zirconium as oxides in the catalyst is Ce$_x$Zr$_{1-x}$O$_2$, wherein X=0.1-0.9.

The mixed oxides can be mixed oxides in solid solutions. "Composite oxide" as defined herein means a largely amorphous oxide material comprising oxides of at least two elements which are not true mixed oxides consisting of the at least two elements.

In another embodiment, the base metal catalyst consists of two or more transition metals.

In embodiments, the or each at least one transition metal can be selected from the group consisting of a Group VIB metal, a Group IB metal, a Group IVA metal, a Group VB metal, a Group VIIB metal, a Group VIII metal, a rare earth metal and mixtures of any two or more thereof. The or each transition metal component can be present in the form of the oxide, hydroxide or free metal (i.e., zero valency). The Group VIII metal can be any one or more of Ni, Co and Fe; illustrative examples of the Group IVA metal with utility in the present invention are Sn and Pb; the Group VB metal include Sb and Bi; one or more of Mn, Tc and Re can be used as the Group VIIB metal; rare earth metals include Ce; Group IB metals can include Cu; and one or more of the Cr, Mo and W can be used for the Group VIB metal. We prefer to avoid Group VIII noble metals, not only because they are more expensive than base metals, but because they undesirably promote non-selective reactions such as reaction (2) hereinabove.

The at least one transition metal can be selected from the group consisting of Cr, Ce, Mn, Fe, Co, Ni, W and Cu or more specifically from the group consisting of Fe, W, Ce and Cu.

In a particular embodiment, the Group VIB metal is tungsten.

In another particular embodiment, the Group VIII metal is iron.

In a particular embodiment, the at least one transition metal consists of tungsten. In a further particular embodiment, the transition metal components of the base metal catalyst consist of iron and tungsten. However, an issue with ceria-based catalysts is that they can be deactivated by sulphur. Through our investigations, we have discovered that tungsten can reduce the propensity for the ceria to become sulphated. Also, binary combinations of transition metals including tungsten, such as tungsten and iron, improves the sulphur tolerance of the non-tungsten transition metal in the combination, in this case the Fe. In a particular embodiment, the catalyst according the invention is not obtained by solely co-precipitating salts of tungsten, cerium and zirconium. In a further embodiment, the catalyst according to the invention is not obtained by co-precipitating cerium and zirconium salts, then impregnating the resulting product only with a tungsten salt and calcining at temperatures between <600° C. In a further embodiment, the catalyst according to the invention does not consist solely of cerium, zirconium and tungsten, i.e. a catalyst comprising cerium, zirconium, iron and tungsten is not excluded.

The total at least one transition metal present in the catalyst can be from 0.01 to 50 wt %, e.g. from 0.1 to 30 wt % or from 0.5 to 20 wt % based on the total weight of the catalyst.

In embodiments, the inert oxide support of (b) is selected from the group consisting of alumina, titania, non-zeolite silica-alumina, ceria, zirconia and mixtures, composite oxides and mixed oxides of any two or more thereof.

Catalysts for use in the method according to the invention are obtainable by methods known to the person skilled in the art including impregnation of support materials with aqueous transition metal salts, incipient wetness or co-precipitation. Whichever preparatory route is selected, in an important aspect of the invention, we have determined that to activate the catalyst for use in the present invention it should be heated in an existing environment, e.g. in air, to elevated temperatures for an appropriate period, e.g. at >600° C. such as at 650° C. and above or at 700° C. and above. We have also discovered that this heat activation step is required for a catalyst consisting of iron and tungsten dispersed on zirconia.

In the method according to the invention, the nitrogen oxides can be reduced with the nitrogenous reducing agent at a temperature of at least 100° C., such as from about 150° C. to 750° C.

In a particular embodiment, the nitrogen oxides reduction is performed in the presence of oxygen.

In the method according to the invention, the addition of nitrogenous reductant can be controlled so that $NH_3$ at the catalyst inlet is controlled to be 60% to 200% of theoretical ammonia calculated at 1:1 $NH_3$/NO and 4:3 $NH_3$/$NO_2$.

In embodiments, the ratio of nitrogen monoxide to nitrogen dioxide in the catalyst inlet gas is from 4:1 to 1:3 by volume. In this regard, the ratio of nitrogen monoxide to nitrogen dioxide in the gas can be adjusted by oxidising nitrogen monoxide to nitrogen dioxide using an oxidation catalyst located upstream of the catalyst.

The nitrogenous reducing agent can be derived from any suitable source including ammonia per se, hydrazine or an ammonia precursor selected from the group consisting of urea $((NH_2)_2CO)$, ammonium carbonate, ammonium carbamate, ammonium hydrogen carbonate and ammonium formate.

The gas containing nitrogen oxides can be derived from any source, but particularly from a combustion process. In one embodiment, the combustion process is the combustion of fuel in an internal combustion engine, such as a vehicular lean-burn internal combustion engine. In particular, the vehicular lean-burn internal combustion engine can be a diesel engine.

According to a second aspect, the invention provides a heterogeneous non-zeolite base metal catalyst for use in a method according to the invention, which catalyst consisting of:
(a) at least one transition metal dispersed on a mixed oxide or composite oxide or a mixture thereof as support material consisting of cerium and zirconium; or
(b) cerium oxide and zirconium oxide as single oxides or a composite oxide thereof or a mixture of the single oxides and the composite oxide dispersed on an inert oxide support material, whereon is dispersed at least one transition metal, wherein the or each at least one transition metal is selected from the group consisting of a Group VIB metal, a Group IB metal, a Group IVA metal, a Group VB metal, a Group VIIB metal, a Group VIII metal and mixtures of any two or more thereof.

In a particular embodiment, the catalyst consists of iron and tungsten dispersed on a mixed oxide or composite oxide consisting of cerium and zirconium.

According to a third aspect, the invention provides a heterogeneous catalyst non-zeolite base metal catalyst for use in a method according to the invention, comprising a catalyst according to the second aspect of the invention in combination with a catalyst consisting of iron and tungsten dispersed on zirconia. By "in combination with" herein we include physical mixtures; substrate monoliths comprising a first zone coating consisting of one component, such as an Fe—W/$ZrO_2$, upstream of a second zone consisting of the other component; and layered systems, wherein e.g. Fe—W/$CeZrO_2$ is located in a layer below a Fe—W/$ZrO_2$ top layer.

EXAMPLES

Example 1

Method of Manufacturing Catalyst and Comparative Catalyst Samples

Fe/Beta Zeolite Catalyst

A 5 wt % Fe on a commercially available Beta zeolite catalyst (5% Fe/Beta—comparative example) was prepared as follows. The required amount of iron nitrate $(Fe(NO_3)_3.9H_2O)$ to give a 5 wt % Fe loading was dissolved in deionised $H_2O$. The total volume of solution was equivalent to the pore volume of the support sample (incipient wetness technique). The solution was added to the Beta zeolite material and the resultant mixture was dried overnight at 105° C. and calcined in air at 500° C. for 1 hour.

Fe—W Catalysts

A 5 wt % Fe-15 wt % W on $ZrO_2$ catalyst (5% Fe-15% W/$ZrO_2$—comparative example); 5 wt % Fe-15 wt % W on a $Ce_xZr_{1-x}O_2$ (x=0.2) mixed oxide catalyst (5% Fe-15% W/Ce0.2Zr0.8$O_2$—according to the invention); 5 wt % Fe-15 wt % W on a $Ce_xZr_{1-x}O_2$ (x=0.5) mixed oxide catalyst (5% Fe-15% W/Ce0.5Zr0.5$O_2$—according to the invention); and 30 wt % $Ce_{0.75}Zr_{0.25}O_2$—$Al_2O_3$ (cerium and zirconium single or composite oxides supported on gamma alumina—30% Ce0.75Zr0.25O$_2$/Al$_2$O$_3$—according to the invention) were prepared as follows. The required amounts of iron nitrate (Fe(NO$_3$)$_3$.9H$_2$O) and ammonium metatungstate to give the desired 5 wt % Fe and 15 wt % W loadings were dissolved in deionised H$_2$O. The total volume of solution was equivalent to the pore volume of the support sample (incipient wetness technique). The solution was added to the support material and the resultant mixture was dried overnight at 105° C. and then calcined at 700° C. for 3 hours. A 15 wt % W on a Ce$_x$Zr$_{1-x}$O$_2$ (x=0.5) mixed oxide catalyst (15% W/Ce0.5Zr0.5O$_2$—according to the invention) was prepared in a similar manner, except that no iron was included in the impregnation medium.

Supports: for the 5 wt % Fe-15 wt % W on ZrO$_2$ catalyst, commercially available Zr(OH)$_4$ was used; for the 5 wt % Fe-15 wt % W on a Ce$_x$Zr$_{1-x}$O$_2$ (x=0.2) mixed oxide catalyst, a commercially available Ce$_{0.2}$Zr$_{0.8}$O$_2$ material was used; for the 5 wt % Fe-15 wt % W on a Ce$_x$Zr$_{1-x}$O$_2$ (x=0.5) mixed oxide catalyst, a commercially available Ce$_{0.5}$Zr$_{0.5}$O$_2$ material was used; and the 30 wt % Ce$_{0.75}$Zr$_{0.25}$O$_2$—Al$_2$O$_3$ was prepared by combining particulate gamma alumina and an appropriate amount/concentration of cerium hydrate and aqueous zirconium nitrate to achieve the desired loading followed by milling. The resulting material was then dried overnight at 105° C. and calcined.

Example 2

Illustrative Combined Catalyst System

A 1:1 mixture of Fe/Beta zeolite and 5 wt % Fe-15 wt % W/ZrO$_2$, each prepared according to Example 1 was prepared by blending together equal portions of the two materials.

Example 3

NH$_3$ SCR Activity Test Conditions

Powder samples of the catalysts prepared according to Examples 1 and 2 were obtained by pelletising the original samples, crushing the pellets and then passing the powder obtained through a 255-350 μm sieve. The powder samples were loaded into a Synthetic Catalyst Activity Test (SCAT) reactor and tested using the following synthetic diesel exhaust gas mixture (at inlet) including nitrogenous reductant: 100 ppm NO, 100 ppm NO$_2$, 200 pm NH$_3$, 12% O$_2$, 4.5% H$_2$O, 4.5% CO$_2$, 200 ppm CO, 100 ppm C$_3$H$_6$, 20 ppm SO$_2$, balance N$_2$ at a space velocity of 45,000 hr$^{-1}$ (gas flow 2 liters per minute). The samples were heated ramp-wise from 150-550° C. at 5° C./min and the composition of the off-gases detected and the activity of the samples to promote NO$_x$ reduction was thereby derived. The results are presented in the accompanying Figures.

From FIG. 1 it can be seen that catalysts containing Fe and W dispersed on Ce$_x$Zr$_{1-x}$O$_2$ mixed oxides and activated at 700° C. show comparatively better performance, especially at low temperature, for the fast SCR reaction (reaction (4) hereinabove) in the NO—NO$_2$ equimolar mixtures than the Fe—W/ZrO$_2$ catalysts.

It can also be seen that the improvement in the low temperature activity depends on the composition of the catalyst, with the sample consisting of Fe—W/Ce$_{0.5}$Zr$_{0.5}$O$_2$ having similar low temperature reactivity (<200° C.) compared with the fresh Fe/Beta catalyst for reaction (4).

Figure 2:
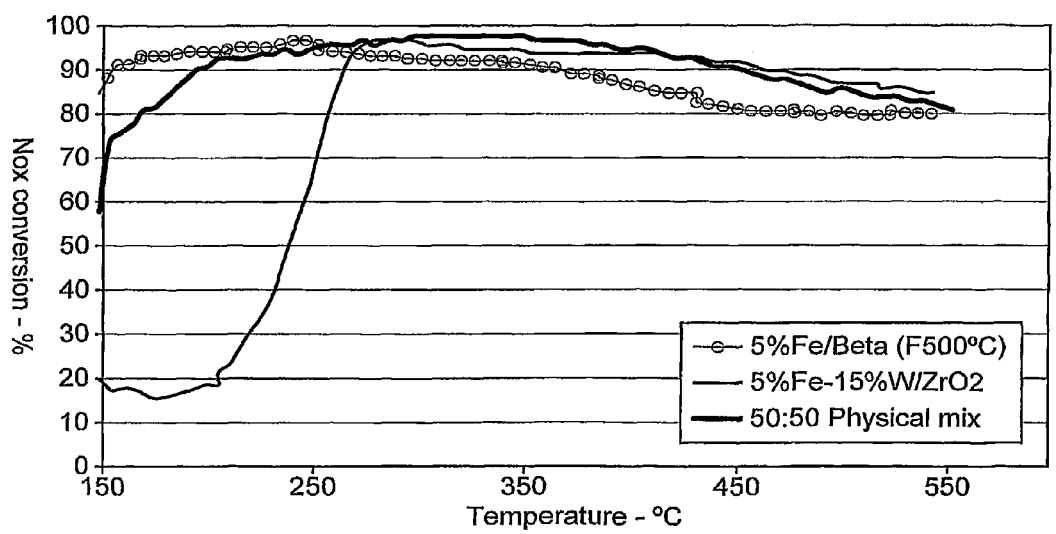
FIG. 2 is a graph comparing the $NO_x$ conversion performance of a Fe—W/ZrO$_2$, fresh Fe/Beta catalyst and a 50:50 physical mixture of both catalysts.

FIG. 2 shows that combining the Fe—W/ZrO$_2$ and Fe/Beta zeolite catalysts leads to a significant improvement in the overall NH$_3$ SCR activity window in NO—NO$_2$ feed mixtures. The combined catalysts exhibit good low temperature activity due to the activity of the Fe/Beta zeolite catalyst, and good high temperature activity due to the Fe—W/ZrO$_2$ catalyst, i.e. the benefits of both catalysts are incorporated into the mixture. The high temperature activity in particular is fully retained in the mixed catalyst system. We consider this to be significant since these conditions are relevant to heavy duty diesel conditions. It would be expected that, from the results shown in FIG. 1, combining the low temperature function of the Fe—W/CeO$_2$—ZrO$_2$ catalysts for use in the present invention with Fe—W/ZrO$_2$ would show a similar benefit.

Furthermore, we believe that, in addition to physical mixtures, advantageous arrangements of the two components can be achieved by disposing the Fe—W/ZrO$_2$ formulation in a zone at an inlet of a flowthrough substrate monolith to achieve good selectivity at high temperatures, and the Fe—W/CeZrO$_2$ formulation is disposed in a zone at the rear of the catalyst bed. It is also expected that a layered system would provide similar benefits, wherein the Fe—W/CeZrO$_2$ is located in a layer below a Fe—W/ZrO$_2$ top layer.

Figure 3:
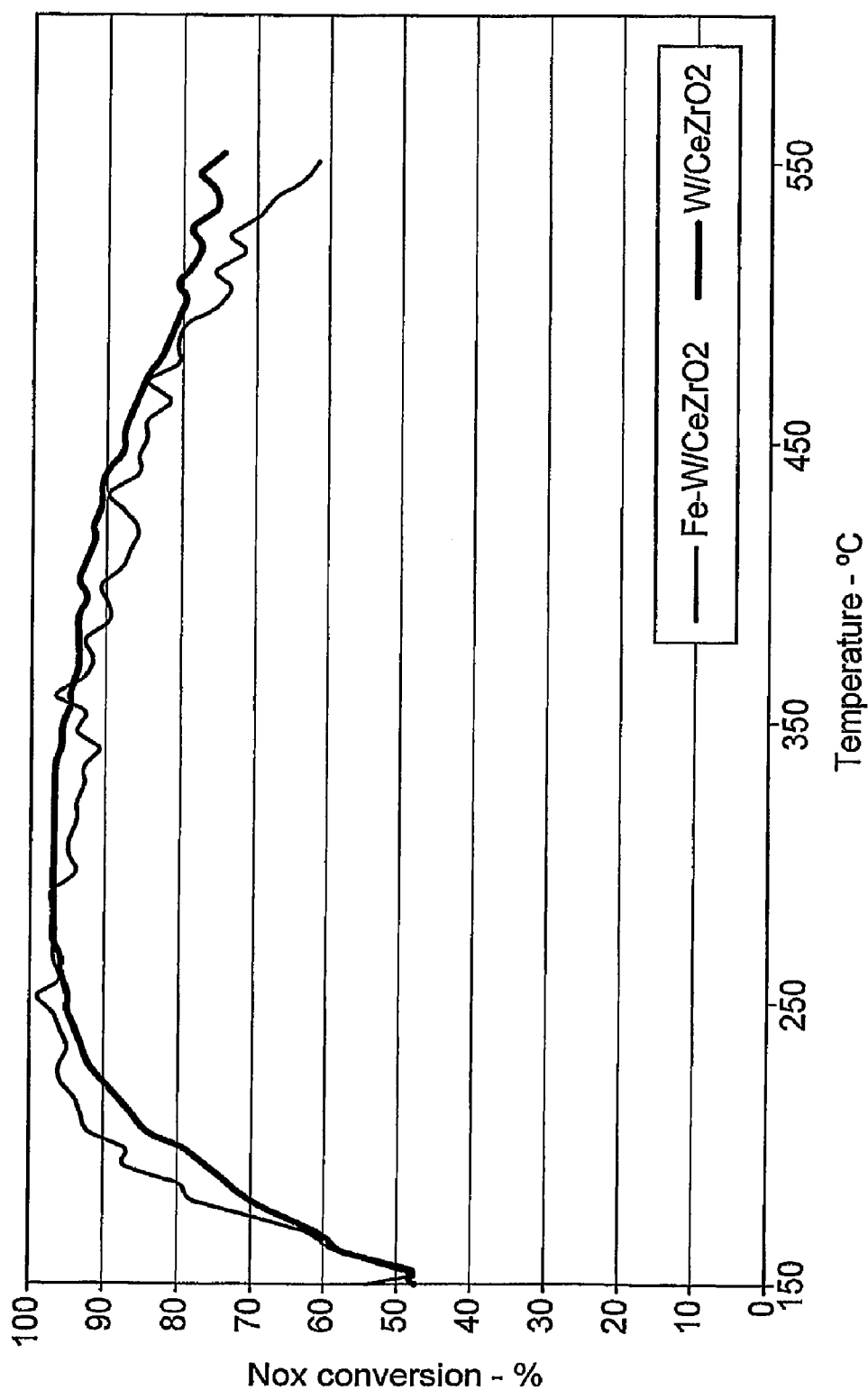
FIG. 3 is a graph comparing the $NO_x$ conversion performance of a fresh Fe—W/CeZrO$_2$ with a fresh W/CeZrO$_2$ catalyst (both according to the invention).

FIG. 3 compares the activity of fresh 15% W/Ce0.5Zr0.5O$_2$ and fresh 5% Fe-15% W/Ce0.5Zr0.5O$_2$ (both according to the invention), from which it can be seen that the W/CeZrO$_2$ material has lower low temperature performance to the Fe—W/CeZrO$_2$ material but similar performance to Fe—W/CeZrO$_2$ at higher temperatures. It follows that the presence of a Group VIII metal may not be essential to the performance of the catalyst. However, in results not shown it was found that the presence of Fe can maintain activity following lean hydrothermal ageing in a sulphur containing atmosphere. Hence, Fe may be a benefit in relatively high fuel sulphur markets.

For the avoidance of any doubt, the entire contents of all references cited herein are incorporated herein by reference.

The invention claimed is:

1. An article for treating a gas containing nitrogen oxides comprising:
   (a) a monolith substrate; and
   (b) a catalytic composition containing at least one catalytic component consisting of (i) at least one transition metal dispersed on a mixed oxide or composite oxide or a mixture thereof as support material consisting of cerium and zirconium; or (ii) cerium oxide and zirconium oxide as single oxides or a composite oxide thereof or a mixture of the single oxides and the composite oxide dispersed on an inert oxide support material, wherein at least one transition metal is dispersed thereon, wherein the at least one transition metal is selected from the group consisting of a Group VIB metal, a Group IB metal, a Group IVA metal, a Group VB metal, a Group VIIB metal, a Group VIII metal and mixtures of any two or more thereof, provided that at least one selected transition metal is tungsten,
   wherein the catalytic composition is disposed on said monolith substrate.

2. The article according to claim 1, wherein the content of cerium and zirconium as oxides in the catalytic component is Ce$_x$Zr$_{1-x}$O$_2$, wherein X=0.1-0.9.

3. The article according to claim 2, wherein the at least one transition metal is two or more dispersed transition metals.

4. The article according to claim 3, wherein the two or more transition metals are selected from the group consisting of Cr, Ce, Mn, Fe, Co, Ni, W and Cu.

5. The article according to claim 3, wherein the two or more transition metals are selected from the group consisting of Fe, W, Ce and Cu.

6. The article according to claim 3, wherein the two or more transition metals comprise iron.

7. The article according to claim 3, wherein the two or more transition metals of the catalytic component consist of iron and tungsten.

8. The article according to claim 1, wherein the total at least one transition metal present in the catalytic component is from 0.01 to 50 wt %, based on the total weight of the catalytic component.

9. The article according to claim 1, wherein the total at least one transition metal present in the catalytic component is from 0.1 to 30 wt %, based on the total weight of the catalytic component.

10. The article according to claim 1, wherein the total at least one transition metal present in the catalytic component is from 0.5 to 20 wt %, based on the total weight of the catalytic component.

11. The article according to claim 1, wherein the catalytic component consists of (i) the at least one transition metal dispersed on the mixed oxide or composite oxide or a mixture thereof as support material consisting of cerium and zirconium.

12. The article according to claim 1, wherein the catalytic component consists of (ii) and the inert oxide support is selected from the group consisting of alumina, titania, non-zeolite silica-alumina, ceria, zirconia and mixtures, composite oxides and mixed oxides of any two or more thereof.

13. The article of claim 12, wherein said inert oxide support is gamma alumina.

14. The article according to claim 1, wherein said catalytic component has been activated at a temperature of at least 600° C.

15. The article according to claim 7, wherein said catalytic component has been activated at a temperature of at least 600° C.

16. The article of claim 1, wherein said catalytic composition further comprises a second catalytic component consisting of iron and tungsten dispersed on zirconia.

17. The article of claim 16, wherein said first catalytic component is disposed on said monolith substrate as a first zone or layer and said second catalytic component is disposed on said monolith substrate as a second zone or layer.

18. The article of claim 17, wherein said first catalytic component is in the first zone and said second catalytic component is in the second zone, wherein said first zone is downstream of said second zone relative to gas flow through the monolith substrate.

19. The article of claim 17, wherein said first catalytic component is in the first layer and said second catalytic component is in the second layer, wherein said first layer is below said second layer relative to the monolith substrate.

20. The article of claim 16, wherein said catalytic composition is a blend of said first and second catalytic components.

* * * * *